United States Patent [19]

Suzuki et al.

[11] Patent Number: 5,305,044
[45] Date of Patent: Apr. 19, 1994

[54] AUTOFOCUSING SYSTEM FOR A CAMERA

[75] Inventors: Noboru Suzuki; Shigeo Toji, both of Tokyo; Masahiro Kawasaki, Saitama, all of Japan

[73] Assignee: Asahi Kogaku Kogyo Kabushiki Kaisha, Tokyo, Japan

[21] Appl. No.: 918,147

[22] Filed: Jul. 24, 1992

Related U.S. Application Data

[63] Continuation of Ser. No. 670,733, Mar. 18, 1991, abandoned, which is a continuation of Ser. No. 414,478, Sep. 29, 1989, abandoned.

[30] Foreign Application Priority Data

Sep. 29, 1988 [JP] Japan .................. 63-245682

[51] Int. Cl.$^5$ .............................................. G03B 13/00
[52] U.S. Cl. .................................. 354/400; 354/195.12
[58] Field of Search ................................ 354/400–409, 354/195.1, 195.12; 359/696–698, 705, 706

[56] References Cited

U.S. PATENT DOCUMENTS

| | | | |
|---|---|---|---|
| 4,145,732 | 3/1979 | Pandres, Jr. | 350/430 |
| 4,156,933 | 5/1979 | Pandres, Jr. | 350/429 |
| 4,509,842 | 4/1985 | Taniguchi et al. | 354/402 |
| 4,560,267 | 12/1985 | Nakai et al. | 354/412 |
| 4,623,238 | 11/1986 | Taniguchi et al. | 354/406 |
| 4,717,933 | 1/1988 | Ando et al. | 354/195.1 |
| 4,720,182 | 1/1988 | Imanari | 350/430 |
| 4,833,497 | 5/1989 | Sugawara | 354/403 |
| 4,861,146 | 8/1989 | Hatase et al. | 350/430 |
| 4,868,592 | 9/1989 | Suzuki et al. | 354/400 |
| 4,951,075 | 8/1990 | Tokumaru et al. | 354/400 |
| 4,975,724 | 12/1990 | Hirasawa et al. | 354/400 |

FOREIGN PATENT DOCUMENTS

| | | |
|---|---|---|
| 53-113527 | 10/1978 | Japan . |
| 54-25819 | 2/1979 | Japan . |
| 15-103273 | 6/1983 | Japan . |
| 60-143309 | 7/1985 | Japan . |
| 61-26015 | 2/1986 | Japan . |
| 61-230111 | 10/1986 | Japan . |
| 62-133430 | 6/1987 | Japan . |
| 62-133431 | 6/1987 | Japan . |
| 62-200340 | 9/1987 | Japan . |
| 63-5331 | 1/1988 | Japan . |
| 63-29717 | 2/1988 | Japan . |
| 63-189817 | 8/1988 | Japan . |
| 63-198026 | 8/1988 | Japan . |
| 63-220118 | 9/1988 | Japan . |
| 63-220679 | 9/1988 | Japan . |
| 44428 | 2/1989 | Japan . |
| 44429 | 2/1989 | Japan . |
| 64-56406 | 3/1989 | Japan . |
| 64-62608 | 3/1989 | Japan . |
| 64-79713 | 3/1989 | Japan . |
| 1-99011 | 4/1989 | Japan . |
| 1-99012 | 4/1989 | Japan . |
| 1-123206 | 5/1989 | Japan . |
| 1-131509 | 5/1989 | Japan . |
| 1-232311 | 9/1989 | Japan . |
| 2-12116 | 1/1990 | Japan . |

OTHER PUBLICATIONS

English Abstract of Japanese Patent No. 61-26015.
English Abstract to Japanese Patent No. 61-230111.

*Primary Examiner*—David M. Gray
*Attorney, Agent, or Firm*—Sandler Greenblum & Bernstein

[57] ABSTRACT

An autofocusing system in the nacro zone of a photographic lens is arranged so that the photographic lens having a zooming zone and a macro zone is provided with a first lens group driven by a first drive means and a second lens group driven by a second drive means, wherein the first lens group is driven for focusing in the zooming and macro zones, whereas the second lens group is driven for zooming in the zooming zone, the second lens group being driven for focusing in the macro zone before the first lens group is thus driven.

19 Claims, 10 Drawing Sheets

AUTOFOCUSING SYSTEM FOR A CAMERA

This application continuation of application Ser. No. 07/670,733, filed Mar. 18, 1991, now abandoned which is a continuation of application Ser. No. 07/414,478, filed on Sep. 29, 1989, now abandoned.

RELATED APPLICATIONS

This Application is generally related to a commonly assigned U.S. patent application, Informal Ser. No. 410,880, filed on Sep. 22, 1989 in the names of Noboru Suzuki, Shigeo Toji, and Masahiro Kawasaki, and entitled "Image Magnification Control Device for a Camera"; and this previously filed application is therefore expressly incorporated by reference herein in its entirety.

BACKGROUND OF THE INVENTION

The present invention relates to an autofocusing system in the macro zone of a zoom lens.

Power zoom lenses driven by drive means such as a motor have recently been employed in so-called compact cameras fitted with an uninterchangeable photographic lens.

In an autofocusing system for such a compact camera equipped with the power lens, a zoom lens group is adjusted, in the zooming zone of a photographic zoom lens, in such a manner that an image of an object is formed on a film plane. Consequently, only a focusing lens group is driven to be in focus after the drive means is used to move and set the zooming lens group to have the certain focal length.

Incidentally, some photographic zoom lenses are designed to have the macro zone for use in close-up photographing by locating the zooming lens group outside the zooming zone.

In the macro zone, however, the focal length of the zooming lens group is constant and, because of photography is performed at a close distance, the distance between the photographic lens and the film needs adjusting so that the distance between the lens and the film corresponds to the distance between the lens and the object by delivering each lens group by a large amount to form an image of the object on the film.

Notwithstanding, a known arrangement is to control the zooming lens group in the macro zone independently of the autofocusing system, as in the zooming zone, such that the photographic lens can be brought into an in-focus condition by driving only the focusing lens group.

For the reasons set forth above, the photographic lens may not be brought into in-focus condition only by driving the focusing lens group, depending on the location of the zooming lens group on the optical axis.

SUMMARY OF THE INVENTION

It is an object of the invention to provide an autofocusing system for a camera that is capable of ensuring the automatic focusing in the macro zone.

For the above purpose, according to the present invention, there is provided an autofocusing system for a camera comprising:

means for driving a photographic lens for changing a focal length thereof in a macro zone of the photographic lens;

means for driving the photographic lens for focusing in the macro zone; and means for controlling said focal length change means and said focus-driving means so as to bring the photographic lens into an in-focus condition, in said macro zone.

According to another aspect of the invention, there is provided an autofocusing system for a camera comprising:

means for driving a photographic lens for focusing in a macro zone of the photographic lens;

means for shifting the range of driving by the focus-driving means of said photographic lens in the macro zone; and means for driving the shift means if the photographic lens is not brought into in-focus condition in the macro zone merely by driving the focus-driving means.

In another aspect of the invention, an autofocusing system for a camera is provided wherein a photographic lens having a zooming zone and a macro zone comprises a first lens group driven by a first drive means and a second lens group driven by a second drive means, wherein the said first lens group is driven for focusing in the zooming and macro zones, and the second lens group is driven for zooming in the zooming zone, the second lens group being driven for focusing in the macro zone before the first lens group is thus driven.

DESCRIPTION OF THE ACCOMPANYING DRAWINGS

DESCRIPTION OF THE EMBODIMENTS

Figure 1:
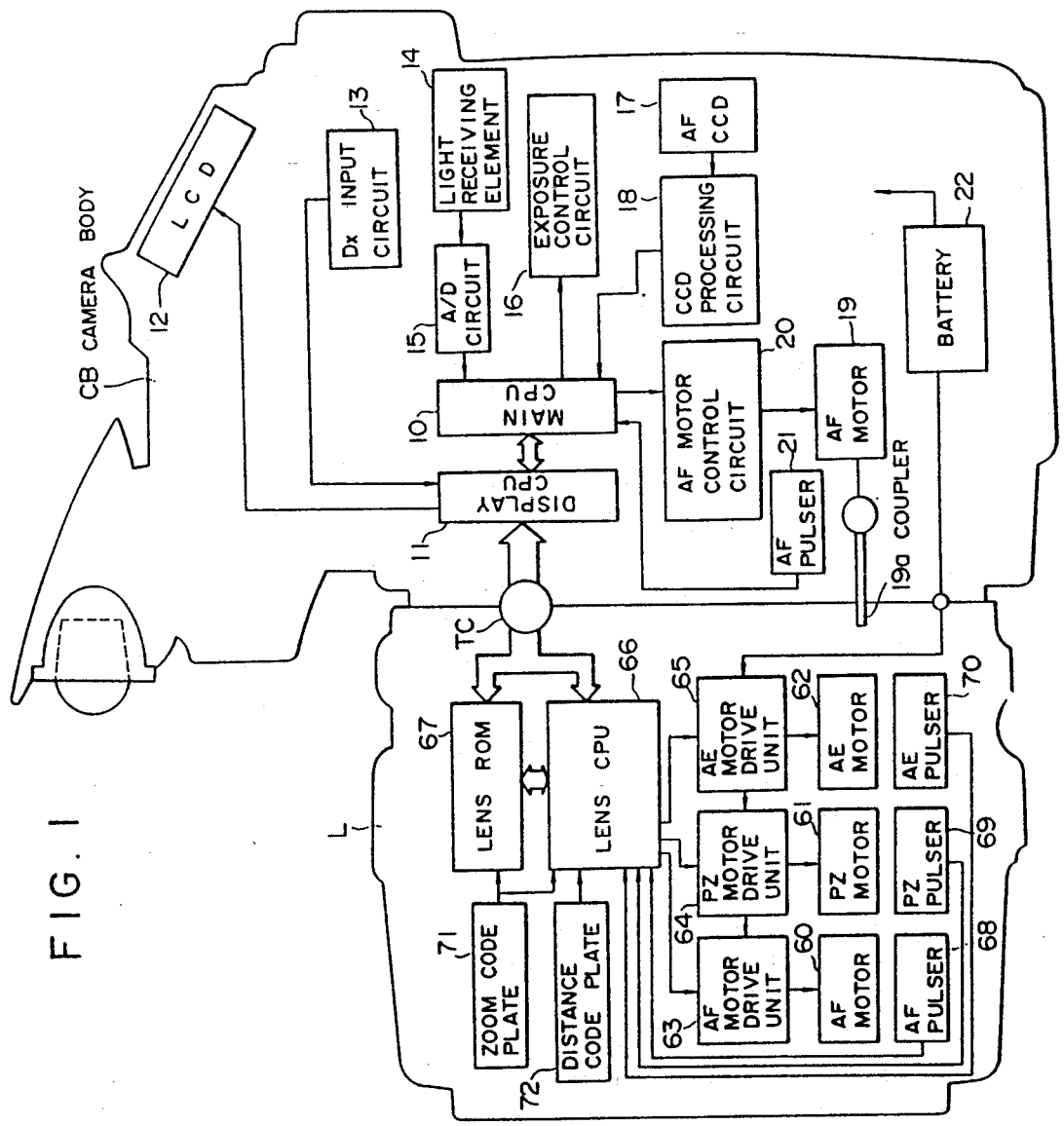
FIG. 1 shows a block diagram illustrating a system configuration as a whole.

Referring to the accompanying drawings, a description will subsequently be given of an embodiment of the present invention applied to an automatic single-lens reflex camera, and also applicable to a still video camera or the like. A camera body CB in this embodiment has a known construction in that it may be fitted with various kinds of photographic lenses interchangeably, as illustrated in FIG. 1. More specifically, the camera body CB is fitted with a power-zoom type photographic lens L having a macro zone which can be made switchable to the macro zone manually from the L-end of the zooming zone, i.e., at the extended side end of the photographic lens.

FIG. 1 is a block diagram of a system combining a photographic lens L and a camera body CB.

The camera body CB is equipped with two CPUs: a main CPU 10 for processing various kinds of photographic data; and a display CPU 11 for receiving data, mainly via switches, for transmitting and receiving data to and for from the photographic lens L, and displaying the data. With these CPUs as the main components, the camera body CB further comprises an LCD panel 12 for displaying various kinds of data, a DX code input circuit 13 for receiving ISO (International Standard Organization) sensitivity of a film for use based on the DX code printed on a film cassette, a light receiving element 14 for measuring the a luminance of an object by luminous flux incident via the photographic lens L, an A/D (Analog/Digital) converter 15 for subjecting the output of the light receiving element to an A/D conversion, an exposure control circuit 16 for controlling a shutter on the basis of various photographic conditions, an AF CCD 17 for receiving an optical image of the object formed by the luminous flux incident thereon via the photographic lens L, and a CCD processing circuit 18 for detecting the in-focus state of the photographic lens L from the output of the AF CCD 17.

An automatic focusing (AF) motor 19 for focusing the photographic lens, together with an AF motor control circuit 20 for driving the AF motor 19 by computing the output of othe CCD processing circuit 18 and an AF pulser 21 for detecting the drive amount of the AF motor 19, are used for transmitting the driving force toward the photographic lens L via a coupler 19a that is provided at a mounting port when the photographic lens L of a conventional type, without an AF motor, mounted. The AF motor 19 is not used in a case such shown in FIG. 1.

A battery 22 is designed to supply power to motors, which will be described later, within the photographic lens L, and to a CPU, in addition to each active element in the camera body CB.

The photographic lens L incorporates three motors; an AF motor 60, a power zoom (PZ) motor 61 and an automatic exposure (AE) control motor 62, whereby the driving force within the lens can be appropriated for automatic focusing, power zooming and exposure control, respectively.

The photographic lens L has cam mechanisms similar to those of a conventional type for effecting focusing and zooming by means of cam rings for use in moving a first and second lens groups relative to the optical axis, the aforementioned AF motor 60 and the PZ motor 61 being used for driving the cam rings to rotate.

The motors are controlled by a lens CPU 66 via an AF motor drive unit 63, a PZ motor drive unit 64, and an AE motor drive unit 65, respectively.

Data input means for lens CPU 66 comprises a lens ROM 67 as a means for storing data inherent to the lens; an AF pulser 68, a PZ pulser 69 and an AE pulser 70 for detecting the drive amounts of the respective motors in the form of pulses; a zoom code plate 71 and a distance code plate 72 for detecting the respective revolved positions of the zooming and focusing cam rings.

In this embodiment, the zoom code plate 71 renders available data as to whether the zooming lens group is located in the zooming zone or the macro zone. The on/off state of a macro switch referred to in step 117 of a flowchart in FIG. 6 signifies, with reference to the data derived from the code plate 71, whether the zooming lens group is in the macro zone.

The code plate actually consists of the code plate secured to the cam ring and a plurality of brushes that are slidably in contact with the code plate, which are fitted to the fixed ring and arranged so that the absolute revolved position of each cam ring is detected from a state in which the brushes come into contact therewith. However, the term "code plate" is used as a general term given to these as a whole for convenience.

The lens CPU 66 is coupled to the control subjects and the input means, and is and also capable of communicating with the camera body CB via groups of electric contacts TC, as a will be described later; e.g., it functions as means for computing the aforesaid drive amount while referring to the data stored in the lens ROM 67 upon receipt of a defocus amount detected on the camera body CB side, for driving the AF motor 60 while detecting the drive amount using the AF pulser 60, and for driving the AE motor 62 to rotate while detecting the drive amount using the AE pulser 70 on the basis of the exposure value determined on the camera body CB side.

Figure 2:
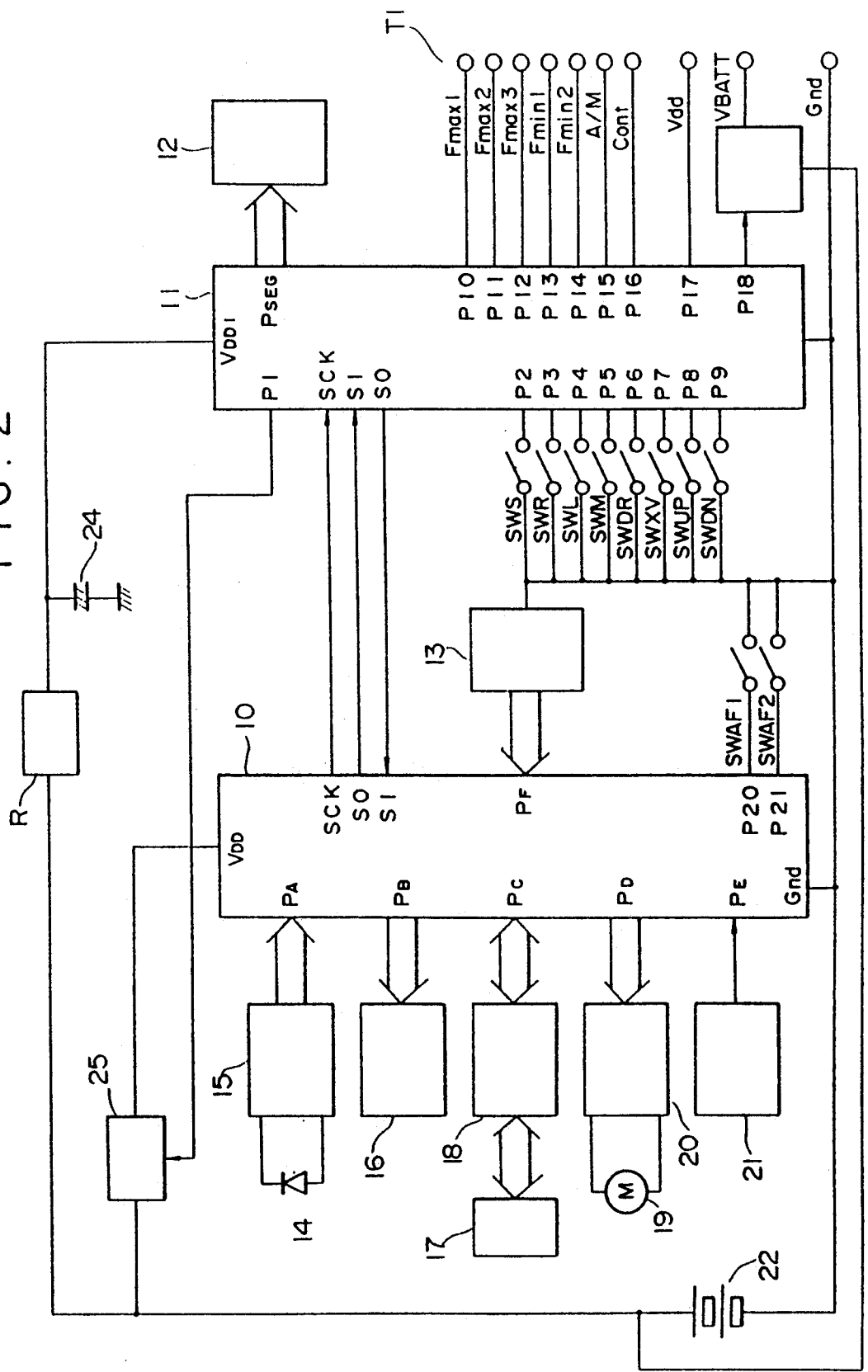
FIG. 2 shows a circuit diagram of a camera body.

A group of electric contact T1, which consist of 10 electric contacts, are provided at the lens mount port of the camera body CB in such a manner that these contacts are insulated from the outer mounting surface of the mounting ring on the camera body (see FIG. 2).

Figure 3:
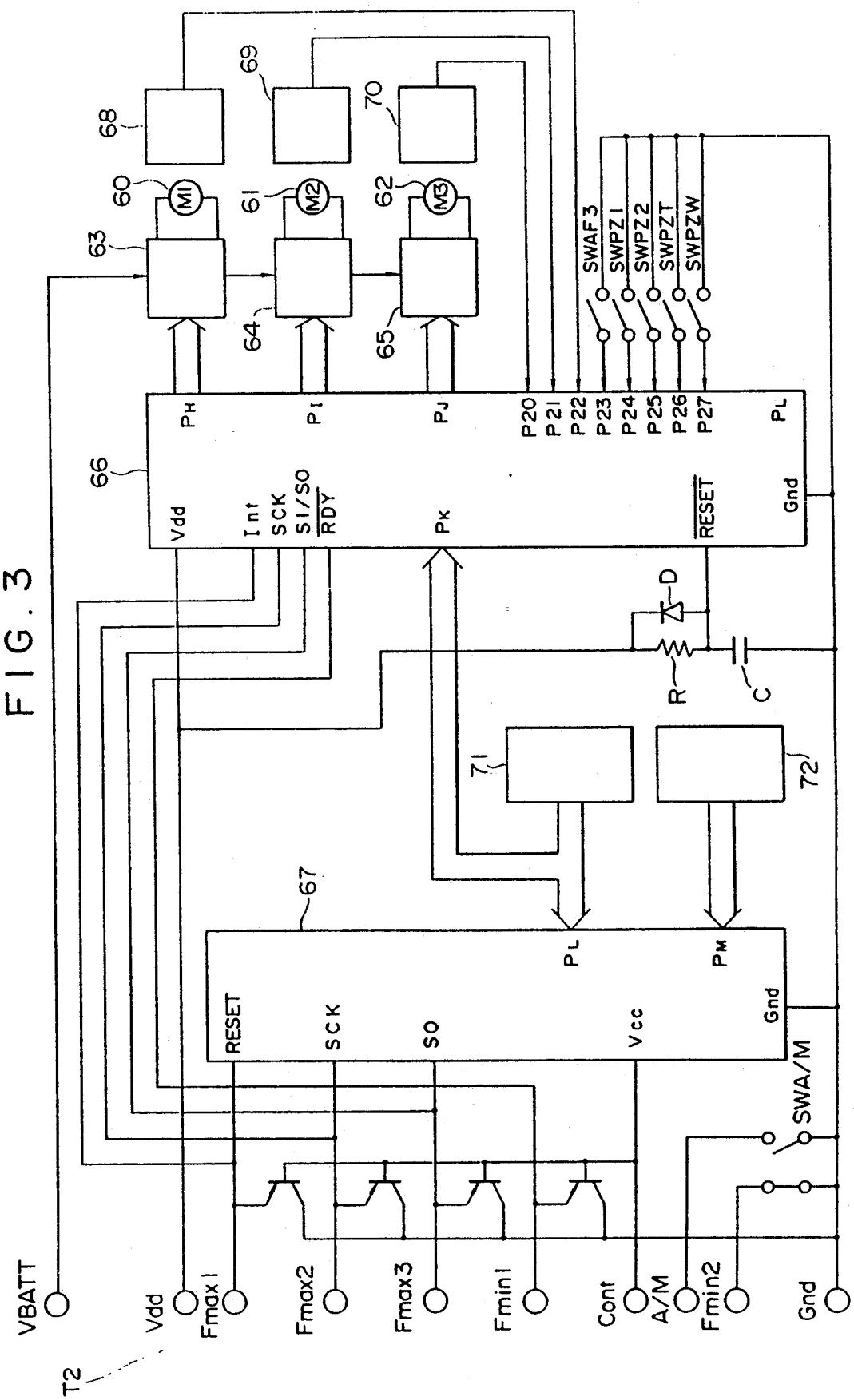
FIG. 3 shows a circuit diagram of a photographic lens.

On the other hand, a group of electric contacts T2 corresponding to the group of electric contacts T1 provided on the camera body CB side are provided in the mount portion of the photographic lens L (FIG. 3).

When the photographic lens L is mounted on the camera body CB, these groups of electric contacts T1, T2 make contact with their respective counterparts to form the aforementioned groups of electric contacts TC.

Referring to detailed circuit diagrams, this system will be described further.

FIG. 2 shows a circuit diagram in the camera body CB.

The voltage of the battery 22 is applied, after being transformed by a regulator R and backed up by a super capacitor 24, to terminal VDD1 of the display CPU 11, which is always operated at constant voltage.

Moreover, terminal P1 of the display CUP 11 is connected to a DC/DC converter 25 for turning on /off the power supply of the main CPU 10; terminal P2 is connected a photometric switch SWS which is turned on when a shutter button is depressed by one step; terminal P3 is connected release switch SWR which is turned on when the shutter button is depressed by two steps; and terminal P4 is connected a lock switch SWL which is turned on when the camera is set to a photographic condition. The data from each switch is thus supplied to the display CPU 11.

The DC/DC converter 25 supplies power to terminal VDD of the main CPU 10 to operate it when the photometric switch SWS is turned on while the lock switch SWL is held on.

Terminal P5 of the display CPU 11 is connected to mode switch SWM for making a photographic mode selectable from among a program, auto and manual photographic modes; terminal P6 is connected drive switch SWDR for selecting either a single shot or a sequential-shot mode while the switch SWDR is held on; and terminal P7 is connected an exposure correction switch SWXV for correcting the set exposure while the switch SWXV is held on. Each setting can be altered by operating an up-count switch SWUP, connected to terminal P8, or down-count switch SWDN, connected to terminal P9 while the switches connected to the terminals P5–P7 are maintained on.

A group of terminals PSEG are used for driving the LCD panel 12 to display stored data when the lock switch SWL is turned on.

A group of contacts PA of the main CPU 10 are connected to a photometric A/D circuit 15; a group of contacts PB are connected to an exposure circuit 16; a group of contacts PC are connected to the CCD processing circuit 18; a group of contacts PD are connected to the AF motor control circuit 20; a group of contacts PE are connected to the AF pulser 21; and a group of contacts PF are connected to the DX code input circuit 13.

As set forth above, the A/D circuit 15 is connected to the photometric light receiving element 14; the CCD processing circuit 18 is connected to the AF CCD 17; and the AF motor control circuit 20 is connected to the AF motor 19 within the camera body CB.

Terminal P20 of the main CPU 10 is connected to a first autofocusing switch SWAF1 for switching to an auto mode wherein focusing is effected by driving the AF motor to a manual mode wherein it is effected manually and vice versa, whereas terminal P21 is connected to a second autofocusing switch SWAF2 for switching priority given to focusing to what is given to releasing in a shutter release mode.

FIG. 3 shows a circuit diagram of the photographic lens L.

Contact VBATT on the lens side is connected to each of the motor drive units 63, 64, 65, and power is directly supplied from the battery 22 in the camera body CB to each of the motors 60, 61, 62 by switching on the drive units one after another.

The motor drive units 63, 64, 65 are connected to groups of terminals PH, PI, PJ of the lens CPU 66 to be controlled thereby, respectively. The pulsers 68, 69, 70 are connected to terminals P20–P22 and are used to deliver the drive amounts of the respective motors to the lens CPU 66.

Contact Vdd is used to supply power supplied from the display CPU 11 on the camera body CB side to terminal Vdd of the lens CPU 66, and a reset circuit comprising a resistor R, a diode D and a capacitor C.

The resistor and the capacitor allow the reset circuit to have a fixed time constant. The reset circuit has the function of having the program fed to the lens CPU 66 started by switching terminal $\overline{\text{RESET}}$ of the lens CPU 66 from an active (L) to a nonactive (H) state when the power supply voltage is stabilized with the passage of a predetermined period of time after the actuation of Vdd.

Terminals P23–P27 of the lens CPU 66 are connected to a third autofocusing switch SWAF3 for performing an auto-to-manual switching of the autofocusing system provided on the lens side. A zoom changeover switch SWPZ1 is provided for the selection of zooming to be to be effected automatically by means of the motor, or to be effected manually, a constant magnification switch SWPZ2 is provided for effecting zooming automatically to accompany the movement of the lens relative to the object so as to hold an image magnification, a zoom switch SWPZT is provided on the Tele side for use in driving the PZ motor 69 in such a manner as to move the photographic lens L in a direction in which the focal length of the lens is lengthened, and a zoom switch SWPZW on the Wide side is provided for use in driving the PZ motor in such a manner as to move the photographic lens L in a direction in which the focal length thereof is shortened.

The lens CPU 66 is equipped with a terminal INT for receiving an electric signal which is applied to interrupt the program being executed by the CPU, terminal SCK receives a serial clock signal from the display CPU 11 on the camera body CB side, terminal SI/SO serially transfers data, and a terminal $\overline{\text{RDY}}$ is for synchronizing serial communication of the lens CPU 66 with peripheral equipment.

Terminal INT allows the lens CPU 66 to be interrupted at L→H after $\overline{\text{RESET}}$, whereas terminal $\overline{\text{RDY}}$ makes the display CPU 11 on the camera body CB side remain on standby to prevent it from executing the serial communication at H and permits it to carry on the serial communication at L.

Like the groups of terminals PL, PM of the lens ROM 67, a group of terminals PK of the lens CPU 66 are connected to the zoom code plate 71 and the distance code plate 72 and made to receive focal length data and distance data corresponding to the actual state of the lens.

The lens ROM 67 stores data inherent in the photographic lens L; e.g. fixed data concerning f-number at an open aperture, the f-number at minimum open aperture, the amount of change of the f-number accompanied by zooming, and variable data.

The data stored in the lens ROM 67 is under the control of the lens CPU 66 or transferred via the groups of electric contacts TC to the CPU on the camera body CB side in compliance with a direct request from the CPU on the camera body CB side.

With this arrangement, an automatic focusing operation is performed in the macro zone as shown by flowcharts of FIGS. 4–13 in the camera system having the aforementioned functions.

Figure 4:
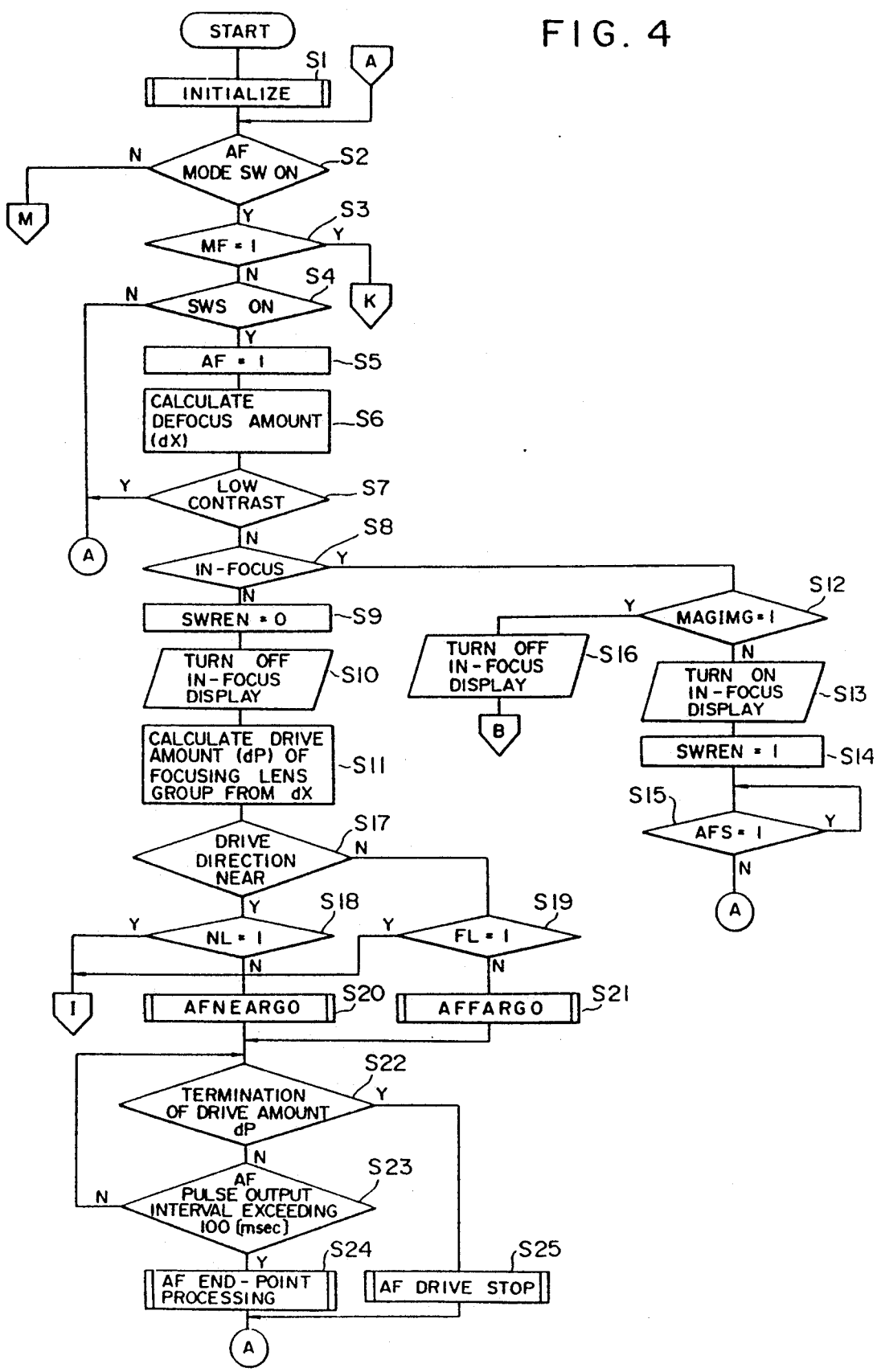
FIGS. 4 and 5 are the main flowcharts representing automatic focusing in the macro zone of this system.

Referring to FIG. 4, a description will first be given of a main flowchart concerning automatic focusing. FIG. 4 is similar to FIG. 14 of the September 22 application incorporated by reference herein, and thus the subroutines B, K, and M, e.g., not elsewhere described herein, may follow similarly referenced subroutines in the referenced application.

The following program is started when power is supplied from the DC/DC converter 25 as the photometric switch SWS is turned on while the lock switch SWL is held on.

In the following discussions, "Step X" corresponds to SX in the Figs, wherein X is a number.

When the program is thus started, an initializing subrouting is first executed in Step 1, and Step 2 followed. The contents of the initializing subroutine will be described in FIG. 6 later.

In Step 2, a decision is made as to whether an AF mode has been set up after the AF mode switch is turned on.

If the AF mode has not yet been set up, this event has to be excluded since this flowchart is not intended to show the process in which the program works in this case.

Step 3 is then followed, provided the AF mode has been set up. In the case of a manual mode other than the AF mode, processing can only be achieved in the manual mode and therefore automatic focusing is not fulfilled (M of FIG. 4).

In Step 3, a decision is made on whether manual focusing is being carried out.

If YES, it means the AF mode has been switched to the manual focusing and, since this flowchart is not intended to show the process in which the program works, as in the case of Step 2, the flow returns via a NG processing mode to Step 2 and enters the manual mode (K of FIG. 4).

If NO, Step 4 is followed and a decision is made as to whether the photometric switch SWS is held on. If YES, a flag representing the AF mode is set in Step 5 and an AF operation starts.

If the decision is NO in Step 4, the flow returns to Step 2 because the user's intention to take pictures is not confirmable and the camera keeps cycling through Steps 2-4 to wait for the photometric switch SWS to be turned on.

When the AF operation starts in Step 5, the defocus amount dx detected by such a detector as the AF CCD 17 is computed in Step 6 and a decision is made as to whether the contrast of the signal detected in the CCD 17 is low in Step 7.

If it is YES, the flow returns to Step 2 because automatic focusing is hardly attainable with the data abtained by, the CCD 17 and keeps cycling through Steps 2-7 to wait for the contrast to be recovered or the manual mode to be selected.

If NO, a decision is made on whether an in-focus state exists in Step 8.

If that state as it stands is not the in-focus state, the decision becomes NO and Steps 9-11 are followed. In Steps 9-11, a flag representing the inhibition of the actuation of the release switch SWR is set; in-focus display is turned off; and the drive amount dp of the focusing lens group is computed from the defocus amount dx.

If the state, as it stands is judged to be in-focus state, as in Step 8, Steps 12-16 are followed and a decision is made on whether the image magnification is being controlled constantly in Step 12. If NO, the in-focus display is turned on and a flag representing the permission of the actuation of the release switch SWR is set in Step 14 and Step 15 is followed.

If YES in Step 12, on the other hand, the in-focus display is turned off in Step 16 and a constant image magnification control mode is followed (B).

In Step 15, a decision is made on whether an in-focus preferential mode has been set up. If YES with the in-focus state being thus created, the focus lock is implemented, whereas if the decision is NO, the flow returns to Step 2 (A).

When the drive amount dp of the focusing lens group is computed with a NO decision in Step 8 as set forth above, the drive direction of the focusing lens group is determined according to the signal given by the aforementioned detector in the following step 17. A decision is then made on whether the focusing lens group is located at the Near end in Step 18 when that drive direction is pointed to the Near side, whereas a decision is made on whether the focusing lens group is located at the Far end in Step 19 when the drive direction is noted to be to the Far side.

Figure 5:
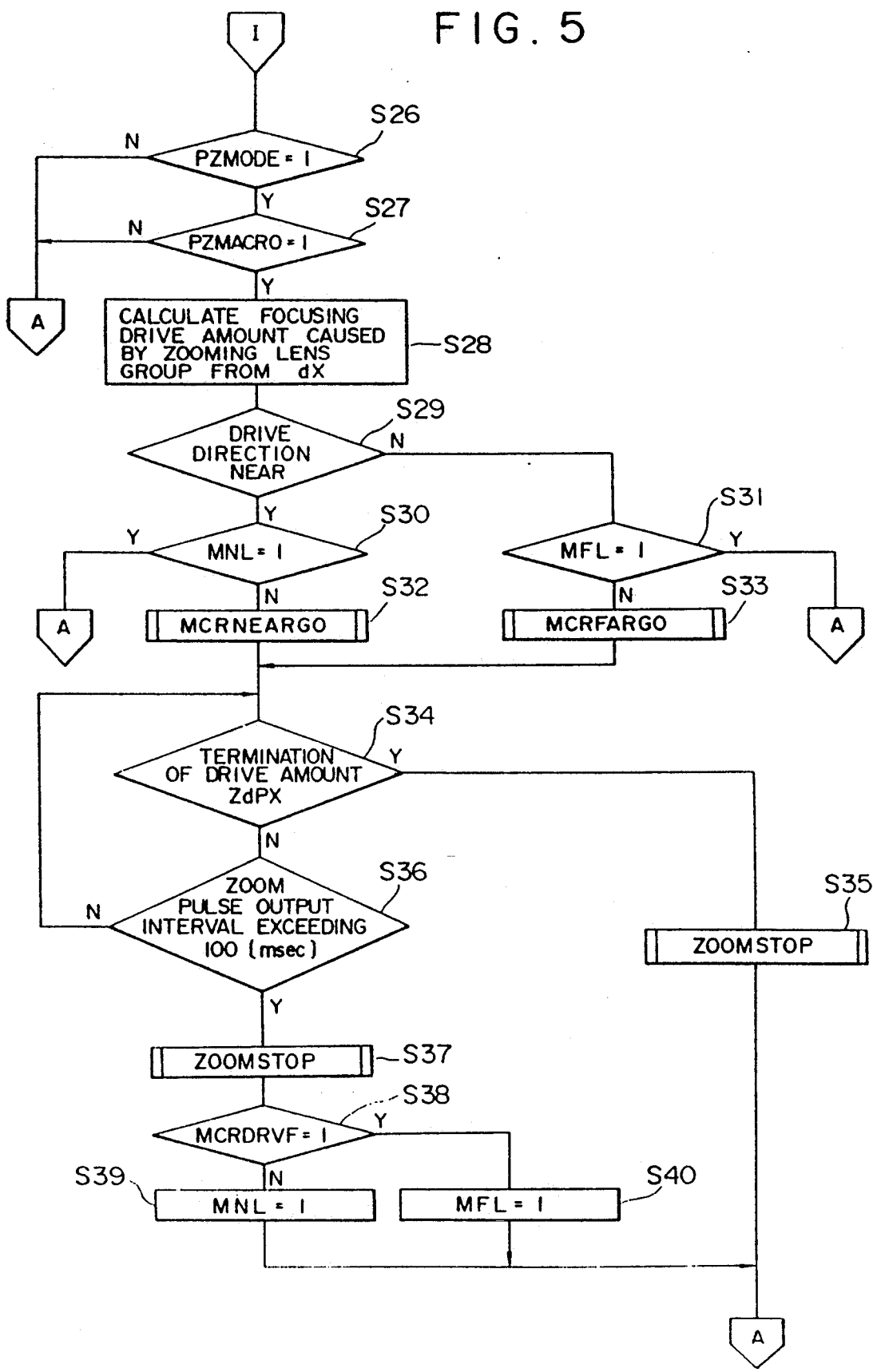

If YES in these steps 18, 19, AF processing in the macro zone is started according to I of FIG. 4 (This processing will be described later in reference to FIG. 5).

If NO in these steps 18, 19, a subroutine (FIGS. 10, 11) for moving the focusing lens group to the end point on the drive direction side is executed in Step 20 or 21. Irrespective of the results obtained therefrom, Step 22 is followed.

In Step 22, a decision is made on whether the focusing lens group has completely been driven to the extent of the drive amount dp. If NO, a decision is made on whether the pulse of the AF pulser 68 is output at intervals exceeding 100 msec in Step 23. If the output interval exceeds 100 msec, an AF end-point processing subroutine (FIG. 12) is executed in Step 24 and the flow returns to Step 2.

If the output interval is not greater than 100 msec, the flow returns to step 22 and keeps cycling through steps 22, 23 to wait for the completion of the drive amount dP or for the AF pulser 68 to be output at intervals of 100 msec.

If YES in step 22, i.e. upon termination of the driving of the focusing lens group by the drive amount dp, Step 25 is followed and, after an AF drive stop subroutine (as will be described in FIG. 13) is executed, the flow returns to Step 2. Photographing is fulfilled in Steps 2-8 and Steps 12-16.

In this embodiment of the present invention, the AF processing in the marco zone is performed continuously from the aforementioned I.

In other words, when Step 26 is followed according to the decision in Steps 18, 19, where the focusing lens group is to be present at the Near or Far end of the extension of the direction in which the lens group is driven, a decision is made on whether a power zoom mode has been set up in Step 26. If YES, a decision is made on whether power zooming is fulfilled in the macro zone in Step 27.

When the power zoom made is not the one set up in the macro zone, the flow returns to Step 2 (A).

When the power zoom mode is the one set up in the macro zone, the drive amount dPX of the zooming lens group is computed from the defocus amount dx detected by the detector, such as the AF CCD 17 in Step 28, and a decision is made on the direction in which the zooming lens group is driven according to the signal from the detection means in Step 29.

When the drive direction is pointed to the Near side, a decision is made on whether the zooming lens group in the macro zone is located at the Near or Far end in Step 30 and, when it is pointed to the Far side, such a decision is made in Step 31.

When the focusing lens group is located at the end of the extension of the direction in which the lens group is driven, the decision made in Step 30 or 31 becomes YES and the flow returns to Step 2.

This is because focusing by means of the zooming lens group has its limitations.

If NO in Steps 30 or 31, Steps 32, 33 are then followed, respectively, wherein a subroutine (FIG. 7) for driving the zooming lens group in the macro zone toward the Near end or another subroutine (FIG. 8) for driving the zooming lens group in the macro zone toward the Far end is executed. Step 34 is then followed.

A decision is then made on whether the driving by dPX has been completed in Step 34. If YES, Step 35 is followed.

In Step 35, a subroutine (FIG. 9) for suspending the driving of the zooming lens group is executed and the zooming lens group is stopped in a substantially in-focus position.

If NO, Step 36 is followed, wherein a decision is made on whether the zoom pulse is output at intervals exceeding 100 msec.

If the zoom pulse is output at intervals exceeding 100 msec, Step 37 is followed and the subroutine (FIG. 9) for suspending the driving of the zooming lens group is executed as the zooming lens group is considered to have been located at the Far or Near end in the macro zone.

If the zoom pulse is output at intervals of not greater than 100 msec, the flow returns to Step 34 and keeps cycling through Steps 34, 36 to wait for the completion of dPX or for the output of PZ pulser 69 to be delivered at intervals of 100 msec.

A decision is subsequently made on the direction in which the zooming lens group has been driven in Step 38, and a flag representing the detection of the Near or Far end of the focusing lens group in the macro zone, a result of the annular zoom drive, is set. Step 2 is then followed.

As set forth above, Step 2 is followed by Steps 28–34 and Step 35, and releasing becomes possible in Steps 12–15 to ensure that the power zoom photographic lens is automatically in focus in the macro zone.

Referring now to FIGS. 6–14, the subroutines shown in FIGS. 4 and 5 will subsequently be described.

Figure 6:
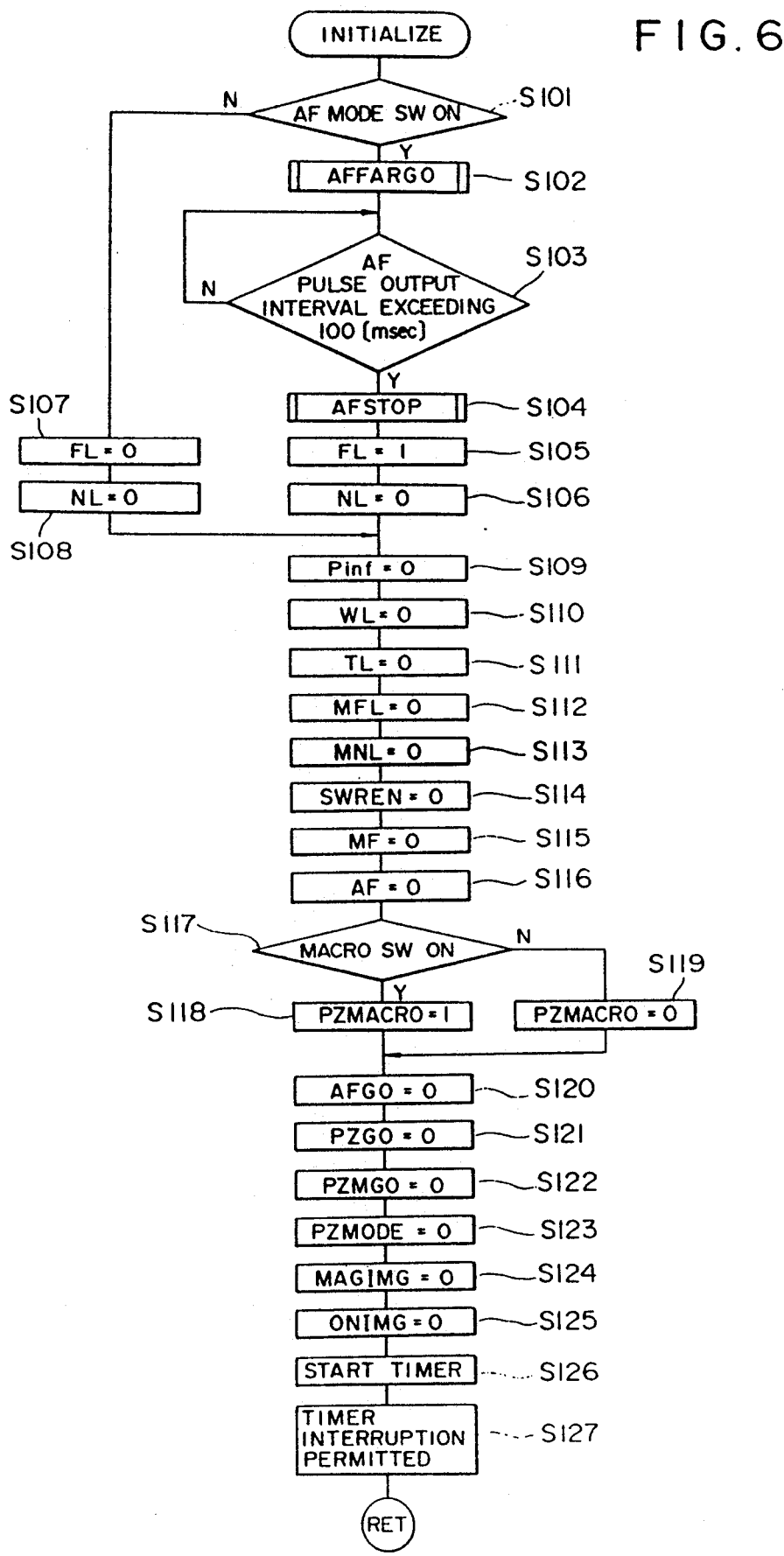
FIG. 6 represent an initializing subroutine.

Referring to FIG. 6, the initializing subroutine will be described.

Figure 11:
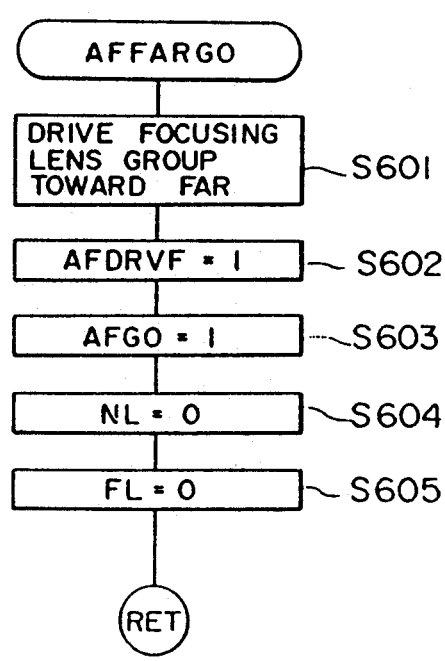
FIG. 11 is a subroutine for driving the focusing lens group in the direction of Far end.

When the initializing subroutine is initiated, a decision is first made on whether the AF mode switch is held on in Step 101. When the switch is turned on to set up the AF mode, the subroutine for driving the focusing lens group up to the Far end is executed in Step 102 (FIG. 11).

In Step 103, a decision is made on whether the AF pulse is output at intervals exceeding 100 msec.

This is because the output interval exceeding 100 msec is considered indicative of the fact that the focusing lens group is located at the Far end.

If the output interval exceeds 100 msec, an AF stop subroutine (FIG. 14) is executed. A flag representing the existence of the focusing lens group at the Far end and another representing the nonexistence thereof at the Near end are set in Steps 105, 106. Step 100 is then followed.

When the manual mode is judged to be in effect in Step 101, on the other hand, flags representing the nonexistence of the focusing lens group at the Far and Near ends are set in Steps 107, 108 respectively. Step 109 is then followed.

In Step 109, the number of pulses Pinf corresponding to the distance of the focusing lens group from the Far end is set to 0. In Steps 110, 111, flags are set: one representing that the zooming lens group is not located at the Wide end and the other representing that the lens group is not located at the Tele end.

In Steps 112, 113, subsequently, flags respectively representing the nonexistence of the focusing lens group at the Far and Near ends in the macro zone, due to the annular zoom drive, are set in order.

In Steps 114–116, further, flags respectively representing release inhibition, non-fulfillment of manual focusing, and autofocusing are set in order.

In Step 117, a decision is made on the on/off state of the macroswitch. What is based on the decision made in this step is data representative of whether the brush position interlocked with the zooming lens group is in the zooming or macro zone.

If the macroswitch is turned on (i.e., if the zooming lens is located in the macro zone), a flag to that effect is set in Step 118, whereas if it is turned off, a flag to that effect is set in Step 119.

In Steps 120–122, followed by either Step 118 or 119, flags respectively representing that the focusing lens group and the zooming lens group remain undriven, are set and the zooming lens remains undriven on an AF basis in the macro zone is set in other.

In Steps 123–125, moreover, flags respectively representing the possibility of the power zoom drive, commencement of constant control over the image magnification, and that image magnification is under constant control are set to 0 in order, whereby a 5 msec timer is started in Step 126, and allowed to be interrupted in Step 127. The flow is then returned.

Figure 7:
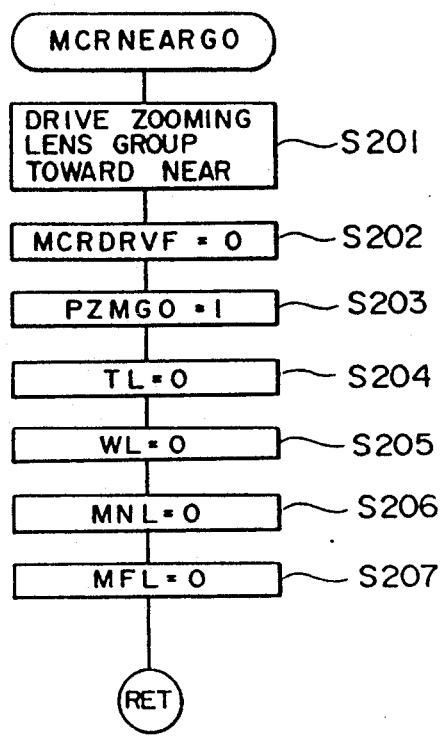
FIG. 7 represent an a subroutine for driving a focusing lens group in the direction of Near end of the macro zone.

Referring to FIG. 7, the subroutine for driving the zooming lens group in the Near direction in the macro zone will subsequently be described.

When the subroutine is initiated, the zooming lens group starts being driven in the Near direction in Step 201. Since the zooming lens group is being driven in the Near direction, in Step 202, a flag representing the zooming lens group being driven in the Far direction is set to 0, and, moreover a flag representing the zooming lens group being driven in the macro zone is set in Step 203.

In Steps 204, 205, flags respectively representing the nonlocation of the zooming lens group at the Tele and Wide ends are set in order.

In Steps 206, 207, flags respectively representing the nonlocation of the zooming lens group at the Near and Far ends in the macro zone are set in order. The flow is then returned.

Figure 8:
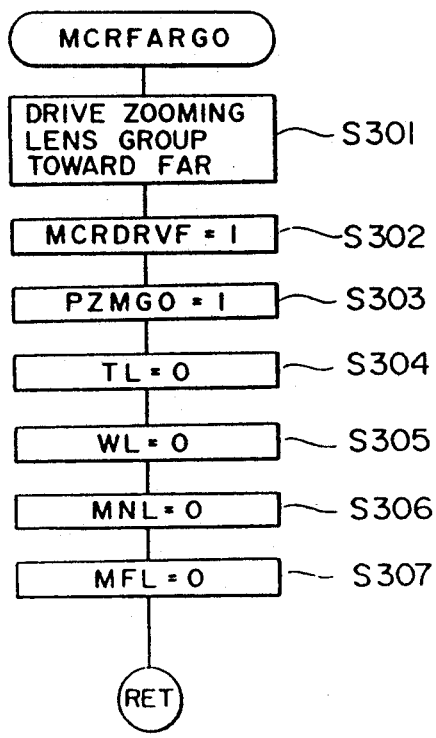
FIG. 8 shows a subroutine for driving a zooming lens group in the direction of the Far end of the macro zone.

Referring to FIG. 8, the subroutine for driving the zooming lens group in the Far direction in the macro zone will be described.

When this subroutine is initiated, the zooming lens group starts being driven in the Far direction in Step 301. In Step 302, a flag representing the zooming lens group being driven in the Far direction is set to 1, whereas a flag representing the zooming lens group being driven for focusing purposes in the macro zone is set in Step 303.

In Steps 304 and 305, flags respectively representing the nonlocation of the zooming lens group at the Tele and Wide ends are set in order.

In Steps 306 and 307, flags respectively representing the nonlocation of the zooming lens group at the Near and Far ends in the macro zone are set in order.

Figure 9:
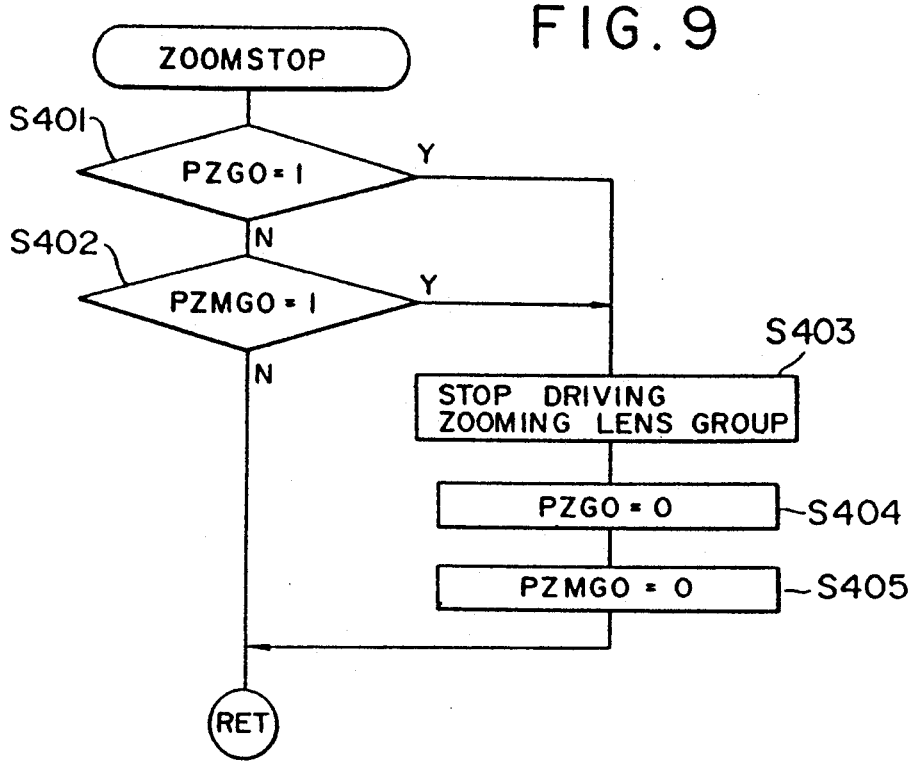
FIG. 9 represents a subroutine for stopping driving of the zooming lens group.

Referring to FIG. 9, the contents of the subroutine for suspending driving of the zooming lens group will be described.

With respect to the subroutine for suspending zooming operation, a decision is made as to whether the zooming lens group is being driven in the zooming or macro zone in Steps 401 and 402. If the zooming lens group is being driven in neither zone, the flow as it stands is then returned.

When the zooming lens group is being driven in either zone, the zooming lens group stops being driven in Step 403, and flags representing the zooming lens group being stopped in Steps 404, 405 are set in order. The flow is then returned.

Figure 10:
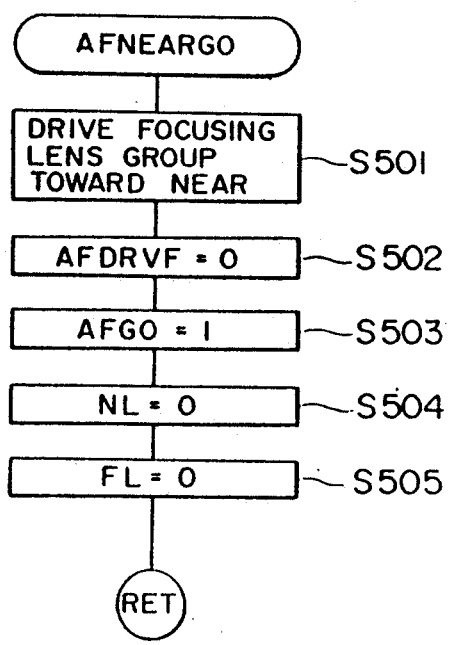
FIG. 10 represents a subroutine for driving the focusing lens group in the direction of Near end.

Referring to FIG. 10, the contents of a subroutine for driving the focusing lens group in the direction of Near end will be described.

When the subroutine for driving the focusing lens group in the direction of Near end is initiated, the focusing lens group starts being driven in the direction of Near end in Step 501. Since the focusing lens group is being driven in the Near direction in Step 502, a flag representing the focusing lens group being driven in the Far direction is set to 0 and a flag representing the focusing lens group being driven is set in Step 503.

In Steps 504, 505, flags respectively representing the nonexistence of the focusing lend group at the Near and Far ends are set in order, and the flow is returned.

Referring to FIG. 11, the contents of a subroutine for driving the focusing lens group in the direction of the Far end will subsequently be described.

When the subroutine for driving the focusing lens group in the direction of the Far end is initiated, the focusing lens group starts being driven in the direction of Far end Step 601. Since the focusing lens group is being driven in the Far direction in Step 602, a flag representing the focusing lens group being driven in the Far direction is set to 1, and a flag representing the focusing lens group being driven is set in Step 603.

In Steps 604, 605, flags respectively representing the nonexistence of the focusing lens group at the Near and Far ends are set in order, and the flow is returned.

Figure 12:
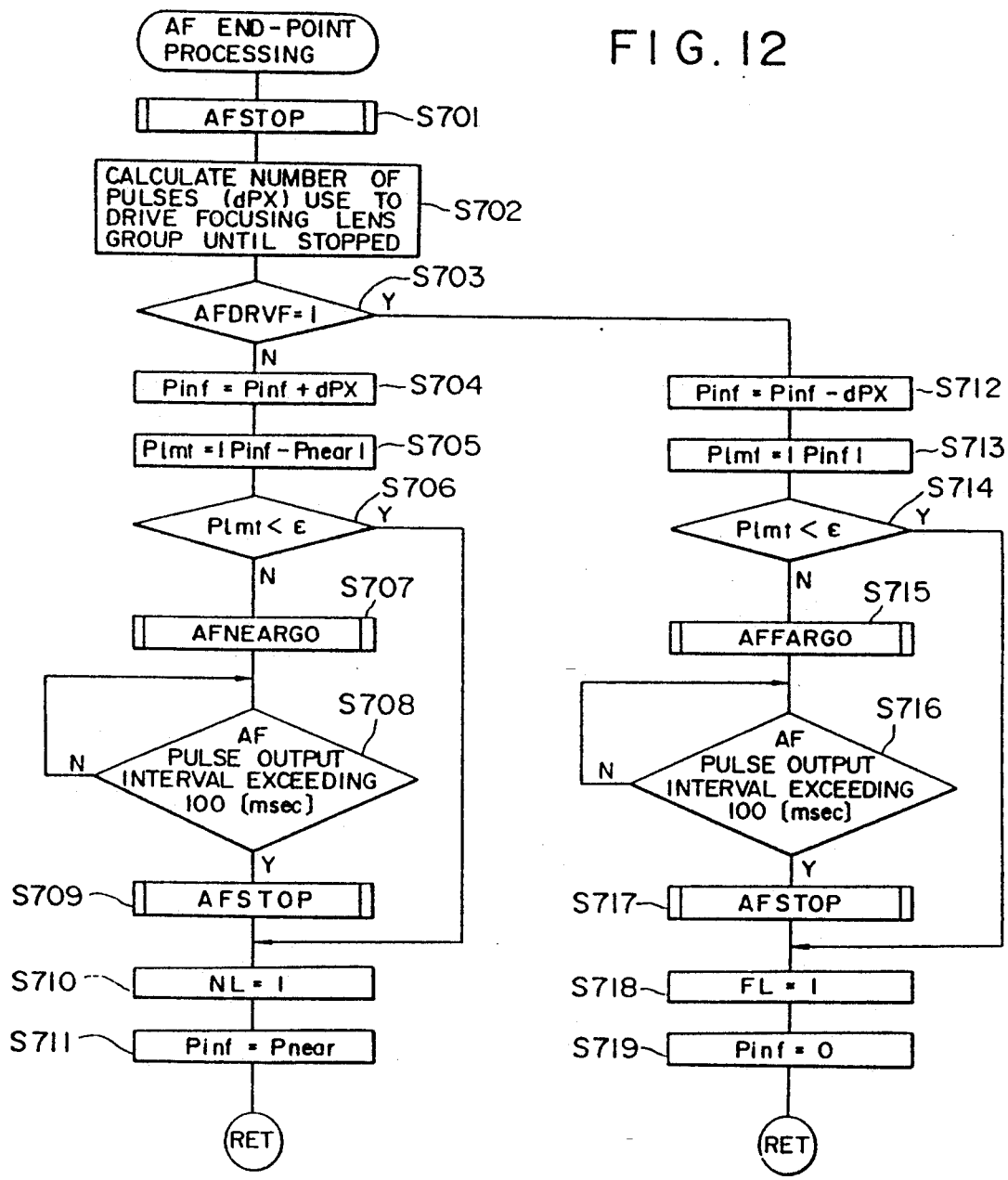
FIG. 12 shows an AF end-point processing subroutine.

The contents of the AF end-point processing subroutine shown in FIG. 12 will subsequently be described.

When the AF end-point processing subroutine is initiated, the AF stop subroutine (FIG. 14) is executed in Step 701, and the number of pulses dPX used to drive the focusing lens group until it stops are computed in Step 702.

A decision is then made on whether the focusing lens group has been driven in the direction of the Far end in Step 703. If NO, the dPX calculated in Step 702 is added to the number of pulses Pinf corresponding to the delivered amount of the focusing lens group from the Far end to set up Pinf, in Step 704. The absolute value of the difference between Pinf and Pnear (the number of pulses from the Far to Near end) is defined as Pint (the number of pulses up to the Near end) in Step 705. Step 706 is then followed.

A decision is then made on whether Pimt is smaller than e (the number of allowable error pulses; e.g., e=10) in Step 706. If NO, the subroutine (FIG. 10) for driving the focusing lens group in the direction of Near end is executed in Step 707, and a decision is made on whether the AF pulse is output at intervals exceeding 100 msec in Step 708.

If the output interval exceeds 100 msec, the AF stop subroutine (FIG. 14) of the focusing lens group is executed in Step 709. If the output interval is not greater than 100 msec, Step 708 is repeated to wait for the end point to be detected, and Step 710 is followed.

If YES in Step 706, on the other hand, Steps 707–709 are skipped and Step 710 is followed because errors are within a predetermined range.

A flag representing the existence of the focusing lens group at the Near end is set in Step 710, and Pinf is rewritten to Pnear so as to eliminate the accumulation of errors in Step 711. The flow is then returned.

If YES in Step 703, on the other hand, the dPX calculated in Step 702 is subtracted from the number of pulses Pinf corresponding to the delivered amount of focusing lens group from the Far end to set up Pinf in Step 712, and the absolute value of Pinf defined as Pint (the number of pulses up to the Near end). Step 714 is then followed.

In Step 714 as in Step 706, a decision is made on whether Pint is smaller than e (i.e., as to the number of allowable error pulses; e.g., e=10). If NO, the subroutine (FIG. 11) for driving the focusing lens group in the direction of the Far end is executed in Step 715, and Step 716 is then followed.

In Step 716, a decision is made on whether the AF pulse is output at intervals exceeding 100 msec. If the output interval exceeds 100 msec, the AF stop subroutine (FIG. 14) of the focusing lens group is executed in Step 717. If the output interval is not greater than 100 msec, Step 716 is repeated to wait for the end point to be detected, and Step 718 is followed.

If YES in Step 714, on the other hand, Steps 715–717 are skipped and Step 718 is followed because errors are within a predetermined range.

In Step 718, a flag representing the existence of the focusing lens group at the Far end is set, and the starting point is modified with 0=Pinf in Step 719. The flow is then returned.

Figure 13:
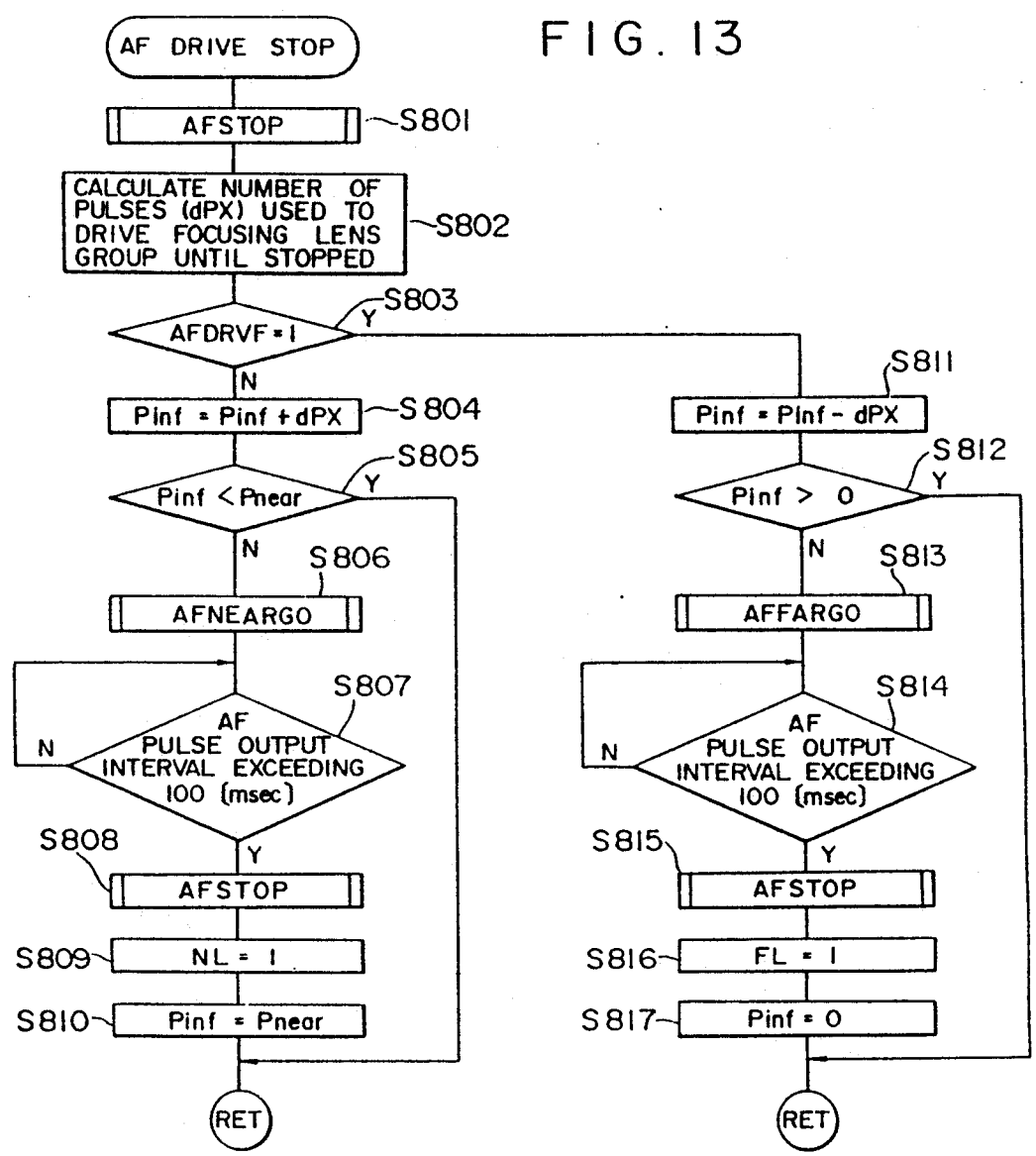
FIG. 13 shows an AF drive stop subroutine.

Referring to FIG. 13, the contents of the AF drive stop subroutine will subsequently be discribed.

When the AF drive stop subroutine is initiated, the AF stop subroutine (FIG. 14) is executed in Step 801 and the number of pulses dPX used to drive the focusing lens group until it stops is computed in Step 802. Step 803 is then followed.

In Step 803, a decision is made on whether the focusing lens group has been driven in the direction of Far end. If NO, the dPX as calculated in Step 802 is added to the number of pulses Pinf corresponding to the delivered amount of the focusing lens group from the Far end to set up Pin in Step 804. Step 805 is then followed.

In Step 805, a decision is made on whether Pinf is smaller than Pnear. If YES, the flow is returned, whereas if NO, the subroutine (FIG. 10) for driving the focusing lens group in the direction of the Near end is executed in Step 806. Step 807 is then followed.

In Step 807, a decision is made on whether the AF pulse is output at intervals exceeding 100 msec, and therefore, whether the end point is reached. If the output interval exceeds 100 msec, the AF stop subroutine (FIG. 14) is executed in Step 808 and Step 809 is followed. If it is not greater than 100 msec, Step 807 is repeated.

In Step 809, a flag representing the existence of the focusing lens group at the Near end is set and Pinf is rewritten to Pnear in Step 810. The flow is then returned.

If YES in Step 803, on the other hand, the dPX value calculated in Step 802 is subtracted from the number of pulses Pinf corresponding to the delivered amount of the focusing lens group from the Far end to set up Pinf in Step 811, and a decision is made on whether Pinf is positive or negative in Step 812.

If YES, the flow is returned. If NO, the subroutine (FIG. 11) for driving the focusing lens group in the direction of Far end is executed in Step 813 and Step is followed.

In Step 814, as in Step 807, a decision is made as to whether the AF pulse is output at intervals exceeding 100 msec.

If the output interval exceeds 100 msec, Step 815 is followed, wherein the AF stop subroutine (FIG. 14) is executed, and Step 816 is followed. If it is not greater than 100 msec, Step 814 is repeated.

In Step 816, a flag representing the existence of the focusing lens group at the Far end is set and Pinf is assumed 0 in Step 817. The flow is then returned.

Figure 14:
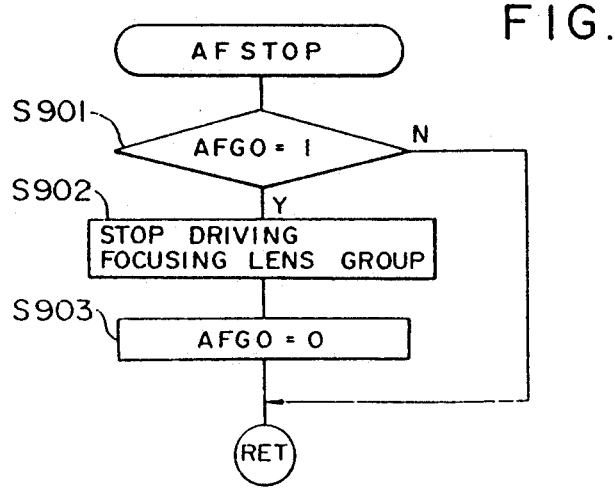
FIG. 14 shows an AF stop subroutine.

Referring to FIG. 14, the AF stop subroutine will subsequently be described.

When the AF stop subroutine is initiated, a decision is made on whether the focusing lens group is being driven on an AF basis in Step 901. If YES, Step 902 is followed, whereas if NO, the flow is returned.

In Step 902, the focusing lens group stops being driven and a flag representing the focusing lens group being stopped is set in Step 903. The flow is then returned.

As set forth above, automatic focusing is consequently fulfilled in the macro zone of the photographic lens in such a manner that the second lens group for effecting zooming in the zooming zone is first driven by the second drive means to be substantially in focus to ensure that the second lens group is automatically in focus even in the macro zone because the first lens group for effecting focusing in the zooming zone is then reqlutatively driven by the first drive means to be accurately in focus.

For interpretation of all terms and acronyms used on this specification and drawings, but not fully described herein, reference is specifically made to the Sep. 22, 1989 application incorporated by reference wherein (for, e.g., SWREN, which is described at page 41; major terms used in the flowchart are described at pages 40–45 of said application).

What is claimed is:

1. A photographic lens system capable of being selectively set in a zoom mode or in a macro mode, said system comprising:
   a first lens group driven for focusing both in said zoom and macro modes, said first lens group being driven in a predetermined movable range;
   a second lens group driven for zooming in said zoom mode;
   determining means for determining whether an object image can be focused on a predetermined image plane, while said system is in said macro mode, by driving said first lens group; and
   means for driving said second lens group so that the object image is focusable on said predetermined image plane by driving said first lens group, while said system is in said macro mode, when it is determined by said determining means that said object image cannot be focused merely by driving said first lens group.

2. The system according to claim 1, wherein said predetermined image plane comprises a film plane.

3. The system according to claim 1, wherein said system comprises a photographic lens body and a camera body, said first and second lens groups and said driving means being housed in said photographic lens body, and further wherein said photographic lens body comprises attachment means for detachably connecting said photographic lens body to said camera body.

4. The system according to claim 1, wherein said driving means comprises at least one motor and means for signalling that said at least one motor has reached its range for moving either of said first and second lens groups.

5. The system according to claim 4, wherein said driving means comprises a first motor for driving said first lens group and a first pulser for signalling that said first motor has reached its range for moving said first lens group, and a second motor for driving said second lens group and a second pulser for signalling that said second motor has reached its range for moving said second lens group.

6. The system according to claim 5, wherein said first and second pulsers comprise means for outputting pulses, and wherein the intervals between said pulses increase to a value above a predetermined threshold when a respective motor has reached its range for moving its respective lens group.

7. The system according to claim 1, further comprising second determining means for determining, when said first lens group is moved to the end of its range by said first means, whether said object image, as focused by said first lens group, is within a range of error of said predetermined image plane.

8. The system according to claim 7, said second means having means for driving said second lens group, in response to a determination by said second determining means that said object image is not within said range of error.

9. A photographic lens system capable of being selectively set in a zoom mode or in a macro mode, said system comprising:
   a first lens group driven for focusing both in said zoom mode and said macro mode;
   a second lens group driven for zooming in said zoom mode;
   driving means for driving said first and second lens groups;
   determining means for determining whether an object image can be focused on a film plane, while said system is in said macro mode, with driving of said first lens group; and
   control means for controlling said driving means in such a fashion that said second lens group is driven for changing a focusable distance range of said system while in said macro mode, the object image being focusable on said film plane by driving said first lens group when the object is located within said focusable distance range, said second lens group being driven when it is determined by said determining means that the object image cannot be focused merely by driving said first lens group.

10. A photographic lens system capable of being selectively set in a zoom mode or in a macro mode, said system comprising:
   a first lens group driven for focusing both in said zoom mode and said macro mode;
   a second lens group driven for zooming in said zoom mode;
   driving means for driving said first and second lens groups;
   determining means for determining whether an object image can be focused on a film plane, while said system is in said macro mode, by driving said first lens group; and
   control means for controlling said driving means in such a fashion that said second lens group is first driven for changing a focusable distance range in said macro mode, the object image being focusable on said film plane by driving said first lens group when the object is located within said focusable distance range, said second lens group being driven when it is determined by said determining means that the object image cannot be focused merely by driving said first lens group, and thereafter said first lens group being driven for focusing the object image onto said film plane.

11. A photographic lens system capable of being selectively set in a zoom mode or in a macro mode, said system comprising:
- a first lens group driven for focusing both in said zoom mode and said macro mode;
- a second lens group driven for zooming in said zoom mode;
- driving means for driving said first and second lens groups;
- determining means for determining whether an object image can be focused on a film plane, while said system is in said macro mode, by driving said first lens group; and
- control means for controlling said driving means in such a fashion that said second lens group is driven for focusing the object image on said film plane, while said system is in said macro mode, when it is determined by said determining means that the object image cannot be focused by driving said first lens group.

12. A photographic lens system capable of being selectively set in a zoom mode or in a macro mode, said system comprising:
- a focus lens group contributing to focusing;
- a zoom lens group contributing to changing of the focal length of said lens system in said zoom mode;
- driving means for driving said focus and zoom lens groups;
- determining means for determining whether an object image can be focused on a film plane, while said system is in said macro mode, by driving said focus lens group; and
- control means for controlling said driving means to drive said zoom lens group so that the object image is focusable on said film plane by driving said focus lens group, while said system is in said macro mode, when it is determined by said determining means that the object image cannot be focused merely by driving said focus lens group.

13. The photographic lens system according to claim 11, said control means further comprising means for controlling said driving means in so that said first lens group is driven, after driving of said second lens group, when said system is in said macro mode and it is determined, by said determining means, that the object image cannot be focused by driving said first lens group.

14. The photographic lens system according to claim 12, further comprising means for driving said focus lens group for focusing when said lens system is in a zoom mode and when said lens system is in a macro mode.

15. The photographic lens system according to claim 1, further comprising means for selectively setting said lens system into a macro mode or into a zoom mode.

16. The photographic lens system according to claim 9, further comprising means for selectively setting said lens system into a macro mode or into a zoom mode.

17. The photographic lens system according to claim 10, further comprising means for selectively setting said lens system into a macro mode or into in a zoom mode.

18. The photographic lens system according to claim 11, further comprising means for setting said lens system into a macro mode or into a zoom mode.

19. The photographic lens system according to claim 12, further comprising means for selectively setting said lens system into a macro mode or into a zoom mode.

* * * * *

UNITED STATES PATENT AND TRADEMARK OFFICE
CERTIFICATE OF CORRECTION

PATENT NO. : 5,305,044

DATED : April 19, 1994

INVENTOR(S) : Noboru Suzuki, et al

It is certified that error appears in the above-identified patent and that said Letters Patent is hereby corrected as shown below:

On the Title Page, Item [56], line 31 under References Cited, "44428" should read --1-44429--.

On the Title Page, Item [56], line 32 under References Cited, "44429" should read -- 1-44429 --.

On the Title Page, Item [56], line 33 under References Cited, "64-56406" should read -- 1-56406 --.

On the Title Page, Item [56], line 34 under References Cited, "64-62608" should read -- 1-62608 --.

On the Title Page, Item [56], line 35 under References Cited, "64-79713" should read -- 1-79713 --.

On the Title Page, Item [57], line 1 of the Abstract "nacro" should read --macro--.

Signed and Sealed this

Twenty-eighth Day of November 1995

Attest:

BRUCE LEHMAN

Attesting Officer

Commissioner of Patents and Trademarks